(12) United States Patent
Naruse

(10) Patent No.: US 11,541,699 B2
(45) Date of Patent: *Jan. 3, 2023

(54) TIRE NOISE REDUCTION DEVICE AND PNEUMATIC TIRE PROVIDED WITH SAME

(71) Applicant: The Yokohama Rubber Co., LTD., Tokyo (JP)

(72) Inventor: Masahiro Naruse, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,321

(22) Filed: Jun. 14, 2022

(65) Prior Publication Data

US 2022/0305851 A1    Sep. 29, 2022

Related U.S. Application Data

(63) Continuation of application No. 16/088,805, filed as application No. PCT/JP2017/011803 on Mar. 23, 2017, now Pat. No. 11,370,254.

(30) Foreign Application Priority Data

Mar. 31, 2016 (JP) ................. 2016-071307

(51) Int. Cl.
*B60C 19/00* (2006.01)
*B60C 5/00* (2006.01)
(Continued)

(52) U.S. Cl.
CPC .............. *B60C 19/002* (2013.01); *B32B 5/00* (2013.01); *B32B 5/18* (2013.01); *B32B 27/06* (2013.01); *B32B 27/065* (2013.01); *B60C 5/00* (2013.01); *F16F 15/10* (2013.01); *G10K 11/16* (2013.01); *G10K 11/168* (2013.01); *Y10T 428/249953* (2015.04)

(58) Field of Classification Search
CPC ......... B32B 27/06; B32B 27/065; B32B 5/00; B32B 5/18; B60C 19/002; B60C 5/00; F16F 15/10; G10K 11/16; G10K 11/168; Y10T 428/249953
See application file for complete search history.

(56) References Cited

U.S. PATENT DOCUMENTS 7,823,613 B2   11/2010   Tanno
2006/0231185 A1   10/2006   Tanno
(Continued)

FOREIGN PATENT DOCUMENTS

JP   2006-044435   2/2006
JP   2006-306285   11/2006
(Continued)

OTHER PUBLICATIONS

International Search Report for International Application No. PCT/JP2017/011803 dated May 9, 2017, 4 pages, Japan.

*Primary Examiner* — Hai Vo
(74) *Attorney, Agent, or Firm* — Thorpe North & Western

(57) ABSTRACT

A tire noise reduction device includes a sound absorbing member made of a porous material; and a band member disposed between the sound absorbing member and the tire inner surface and provided for attaching the sound absorbing member to a tire inner surface, the band member including chamfered portions on both surface sides at both ends in a width direction of the band member.

8 Claims, 8 Drawing Sheets

(51) Int. Cl.
  *G10K 11/168*  (2006.01)
  *B32B 5/00*  (2006.01)
  *G10K 11/16*  (2006.01)
  *F16F 15/10*  (2006.01)
  *B32B 5/18*  (2006.01)
  *B32B 27/06*  (2006.01)

(56) References Cited

U.S. PATENT DOCUMENTS

| | | |
|---|---|---|
| 2007/0119532 A1 | 5/2007 | Tanno et al. |
| 2008/0073016 A1 | 3/2008 | Tanno et al. |
| 2009/0320980 A1 | 12/2009 | Tanno |
| 2013/0098522 A1 | 4/2013 | Tanno |
| 2013/0098533 A1 | 4/2013 | Tanno |
| 2013/0134001 A1 | 5/2013 | Liu |
| 2015/0151584 A1 | 6/2015 | Koishikawa |
| 2017/0136833 A1 | 5/2017 | Narase |
| 2018/0215208 A1 | 8/2018 | Kanenari |
| 2018/0215209 A1 | 8/2018 | Narase |

FOREIGN PATENT DOCUMENTS

| | | |
|---|---|---|
| JP | 4281874 | 6/2009 |
| JP | 2011-225180 | 11/2011 |
| JP | 2012-236521 | 12/2012 |
| WO | WO 2005/012006 | 2/2005 |
| WO | WO 2005/012007 | 2/2005 |
| WO | WO 2006/013874 | 2/2006 |
| WO | WO 2006/118200 | 11/2006 |
| WO | WO 2015/198995 | 12/2015 |
| WO | WO 2016/027723 | 2/2016 |
| WO | WO 2016/027724 | 2/2016 |

TIRE NOISE REDUCTION DEVICE AND PNEUMATIC TIRE PROVIDED WITH SAME

RELATED APPLICATIONS

This application is a continuation of U.S. patent application Ser. No. 16/088,805, filed on Sep. 26, 2018, which is the National Stage of International Patent Application No. PCT/JP2017/011803, filed on Mar. 23, 2017, which claims the benefit of priority from Japan Patent Application No. 2016-071307, filed on Mar. 31, 2016, the entire contents of each of which are incorporated herein by reference.

TECHNICAL FIELD

The present technology relates to a device for reducing cavernous resonance generated in a pneumatic tire, and more specifically relates to a tire noise reduction device that can improve high-speed durability performance by inhibiting breakage of a sound absorbing member and damage to a tire inner surface that are caused by friction between a band member and the sound absorbing member and between the band member and the tire inner surface, and a pneumatic tire provided with the tire noise reduction device.

BACKGROUND ART

Cavernous resonance, which is caused by vibration of air inflating a tire cavity portion, is one cause of tire noise. The cavernous resonance occurs as a result of a tread portion of a tire, which is in contact with a road surface when a vehicle is driven, vibrating due to unevenness of the road surface, and the vibration causing the air inside the tire cavity portion to vibrate. Of the cavernous resonance, there is a frequency band that is perceived as noise, and it is thus important to reduce the noise level of this frequency band in order to reduce the tire noise.

As a method for reducing the noise caused by the cavernous resonance phenomenon described above, a technology has been proposed in which a sound absorbing member made of a porous material, such as a sponge, is attached to a tire inner surface, namely, on an inner circumferential surface of a tread portion using an elastic fixing band (see Japan Patent No. 4281874, for example).

However, when the elastic fixing band has a rectangular cross-section, the sound absorbing member is caused to warp due to the centrifugal force when the vehicle is driven for a long time in a high-speed region. As a result, friction occurs between edge portions of the elastic fixing band and the sound absorbing member and between edge portions of the sound absorbing member and the tire inner surface, and breakage of the sound absorbing member and damage to the tire inner surface may occur.

SUMMARY

The present technology provides a tire noise reduction device that can improve high-speed durability performance by inhibiting breakage of a sound absorbing member and damage to a tire inner surface that are caused by friction between a band member and the sound absorbing member and between the band member and the tire inner surface, and a pneumatic tire provided with the tire noise reduction device.

A tire noise reduction device of the present technology is provided with a sound absorbing member made of a porous material and a band member provided for attaching the sound absorbing member to a tire inner surface and disposed between the sound absorbing member and the tire inner surface. The band member includes chamfered portions on both surface sides at both ends in a width direction of the band member.

Further, the tire noise reduction device described above is provided inside a cavity portion of a pneumatic tire of the present technology.

In the present technology, a tire noise reduction device includes a sound absorbing member made of a porous material and a band member that is disposed between the sound absorbing member and a tire inner surface and attaches the sound absorbing member to the tire inner surface. By including chamfered portions on both surface sides at both ends in a width direction of the band member, breakage of the sound absorbing member and damage to the tire inner surface that are caused by friction between the band member and the sound absorbing member and between the band member and the tire inner surface can be inhibited.

In the present technology, it is preferable that each of the chamfered portions in the band member be formed as a flat surface, and that an angle θ1, with respect to the width direction of the band member, of a chamfered portion C1 positioned on an inner circumferential surface side of the band member, and an angle θ2, with respect to the width direction of the band member, of a chamfered portion C2 positioned on an outer circumferential surface side of the band member be respectively set to be in a range of $110°≤θ1≤160°$ and $110°≤θ2≤160°$. By forming the chamfered portions C1 and C2 in this way, the breakage of the sound absorbing member and the damage to the tire inner surface that are caused by the friction between the band member and the sound absorbing member and between the band member and the tire inner surface can be more effectively inhibited. Both the angles θ1 and θ2 of the chamfered portions C1 and C2 are more preferably set to be in a range from 135° to 160°.

In the present technology, the angle θ1 is preferably larger than the angle θ2. Since durability of the sound absorbing member is lower than that of the tire inner surface with respect to the friction with the band member, by making the angle θ1 of the chamfered portion C1 on the sound absorbing member side relatively larger, the durability of the sound absorbing member with respect to the friction with the band member is improved. On the other hand, by making the angle θ2 of the chamfered portion C2 on the tire inner surface side relatively smaller, a cross-sectional area of the band member is made as large as possible, and thus, weakening of strength of the band member can be minimized.

In the present technology, it is preferable that each of the chamfered portions in the band member be formed as a curved surface, and that a radius of curvature r1 of a chamfered portion R1 positioned on the inner circumferential surface side of the band member, and a radius of curvature r2 of a chamfered portion R2 positioned on an outer circumferential surface side of the band member be respectively set to be in a range of $0.1\,T_B≤r1≤0.5\,T_B$ and $0.1\,T_B≤r2≤0.5\,T_B$ with respect to a thickness $T_B$ of the band member. By forming the chamfered portions R1 and R2 in this way, the breakage of the sound absorbing member and the damage to the tire inner surface that are caused by the friction between the band member and the sound absorbing member and between the band member and the tire inner surface can be more effectively inhibited. The radii of curvature r1 and r2 are more preferably set to be in a range of $0.3\,T_B≤r1≤0.5\,T_B$ and $0.3\,T_B≤r2≤0.5\,T_B$, respectively.

In the present technology, the radius of curvature r1 is preferably larger than the radius of curvature r2. Since the durability of the sound absorbing member is lower than that of the tire inner surface with respect to the friction with the band member, by making the radius of curvature r1 of the chamfered portion R1 on the sound absorbing member side relatively larger, the durability of the sound absorbing member with respect to the friction with the band member is improved. On the other hand, by making the radius of curvature r2 of the chamfered portion R2 on the tire inner surface side relatively smaller, the cross-sectional area of the band member is made as large as possible, and thus, the weakening of the strength of the band member can be minimized.

BRIEF DESCRIPTION OF DRAWINGS

FIGS. 8A and 8B are cross-sectional views illustrating a sound absorbing member and a band member in a noise reduction device.

DETAILED DESCRIPTION

Figure 1:
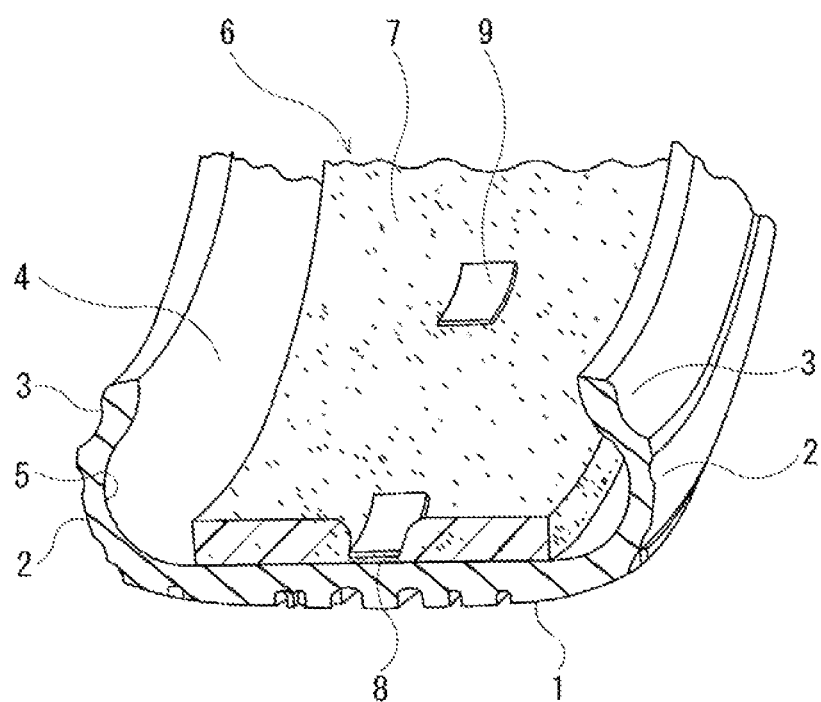
FIG. 1 is a perspective cross-sectional view illustrating a pneumatic tire provided with a tire noise reduction device according to an embodiment of the present technology.
Figure 2:
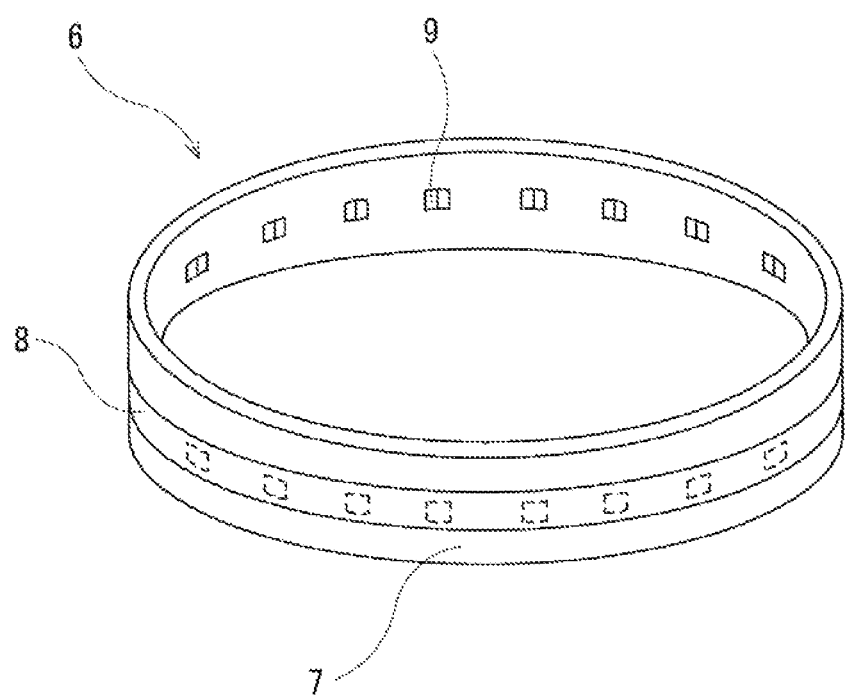
FIG. 2 is a perspective view illustrating a tire noise reduction device according to an embodiment of the present technology.
Figure 3:
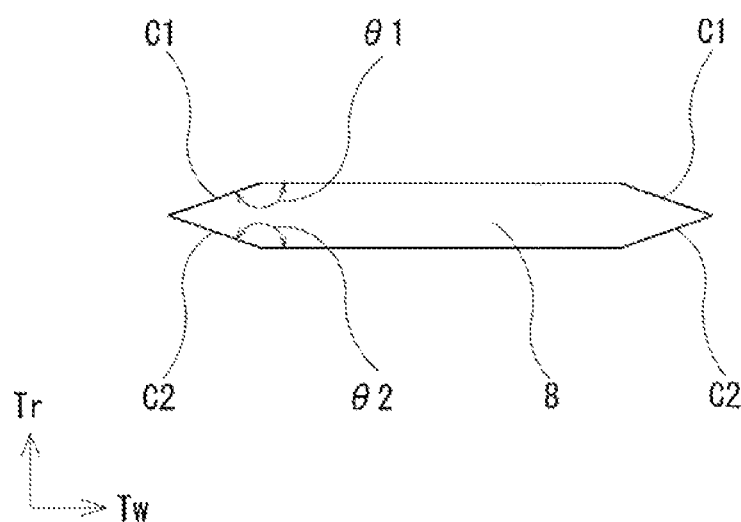
FIG. 3 is a cross-sectional view schematically illustrating an example of a band member in a tire noise reduction device according to an embodiment of the present technology.

A configuration of the present technology is described in detail below with reference to the accompanying drawings. FIG. 1 illustrates a pneumatic tire according to an embodiment of the present technology, and FIG. 2 illustrates a tire noise reduction device according to an embodiment of the present technology. FIG. 3 illustrates a band member in the tire noise reduction device according to an embodiment of the present technology.

In FIG. 1, the pneumatic tire includes a tread portion 1 that is annular and extends in a tire circumferential direction, a pair of sidewall portions 2 disposed on both sides of the tread portion 1, and a pair of bead portions 3 disposed inside of the sidewall portions 2 in a tire radial direction. Furthermore, a tire noise reduction device 6 that is ring-like and illustrated in FIG. 2 is attached to a cavity portion 4 that is surrounded by the tread portion 1, the sidewall portions 2, and the bead portions 3. The tire noise reduction device 6 is disposed in a region, of a tire inner surface 5, corresponding to the tread portion 1. In FIG. 3, Tw indicates a tire lateral direction, and Tr indicates the tire radial direction.

The tire noise reduction device 6 includes a sound absorbing member 7 made of a porous material, and a band member 8 configured to attach the sound absorbing member 7 to the tire inner surface 5. The band member 8 is formed in an annular shape so as to extend along the tire inner surface 5, and the sound absorbing member 7 is bonded to an inner circumferential surface of the band member 8 along a circumferential direction of the band member 8. A number of the sound absorbing members 7 is not particularly limited. A plurality of the sound absorbing members 7 may be included, and the sound absorbing members 7 can be bonded to the inner circumferential surface of the band member 8 while spaced apart from each other. The sound absorbing member 7 includes many internal cells and has predetermined sound absorbing properties based on the porous structure thereof. Polyurethane foam is preferably used as the porous material of the sound absorbing member 7. The band member 8 holds the sound absorbing member 7 on the tire inner surface 5 using an elastic restoring force of the band member 8. The tire noise reduction device 6 configured as described above can be freely attached to and removed from a normal pneumatic tire, and removal and attachment operations of the tire noise reduction device 6 can be easily performed.

In the tire noise reduction device 6 described above, ultrasonic welding is adopted as bonding means for bonding the sound absorbing member 7 and the band member 8. Specifically, the sound absorbing member 7 is disposed between the band member 8 and a locking member 9, and the locking member 9 is ultrasonically welded to the band member 8 via the sound absorbing member 7. The same type of thermoplastic resin, such as polypropylene, is preferably used as a constituent material of the band member 8 and the constituent material of the locking member 9. In this way, bonding by the ultrasonic welding described above can be easily performed. Further, although the ultrasonic welding described above is preferably used as the bonding means for bonding the sound absorbing member 7 and the band member 8, a bonding method thereof is not particularly limited, and thermal bonding, an adhesive, double-sided tape, or mechanical locking means can also be used.

In the tire noise reduction device 6 described above, chamfered portions C1 and C2 are formed on the band member 8 illustrated in FIG. 3, on both surface sides at both ends in a width direction thereof. Of the chamfered portions C1 and C2, the portions disposed on an inner circumferential surface side (on the inside in the tire radial direction) of the band member 8 and adjacent to the sound absorbing member 7 are the chamfered portions C1, and the portions disposed on an outer circumferential surface side (on the outside in the tire radial direction) of the band member 8 and adjacent to the tire inner surface 5 are the chamfered portions C2. Further, the chamfered portions C1 and C2 are preferably formed along the circumferential direction of the band member 8, but may be formed intermittently in the circumferential direction of the band member 8.

In the tire noise reduction device 6 described above that is provided with the sound absorbing member 7 made of the porous material and the band member 8 for attaching the sound absorbing member 7 to the tire inner surface 5, the band member 8 being disposed between the sound absorbing member 7 and the tire inner surface 5, by including the chamfered portions C1 and C2 on both surface sides at both ends in the width direction of the band member 8, breakage of the sound absorbing member 7 and damage to the tire inner surface 5 that are caused by friction between the band member 8 and the sound absorbing member 7 and between the band member 8 and the tire inner surface 5 can be inhibited.

Figure 8A:
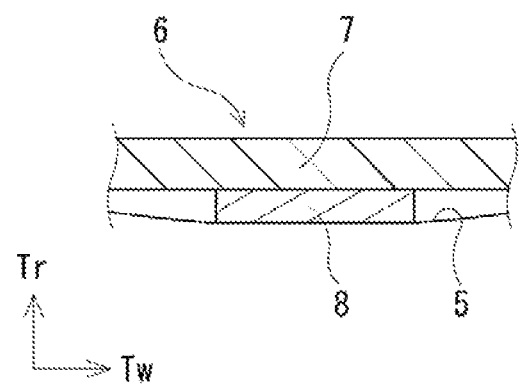
FIGS. 8A and 8B illustrate a state in which a known tire noise reduction device is installed on a tire inner surface.
Figure 8B:
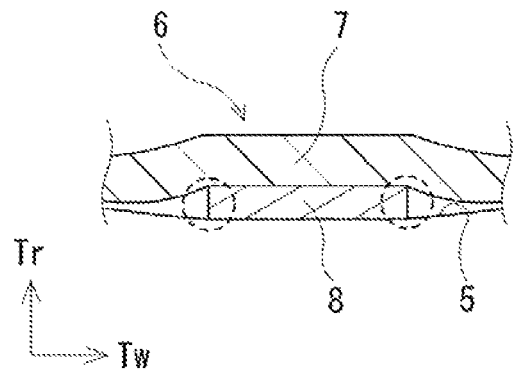

In contrast, when the band member 8 has a rectangular cross-section in the tire noise reduction device 6 which is known and illustrated in FIG. 8A, the band member 8 has a higher strength than a band member provided with the chamfered portions, since the band member 8 has a larger cross-sectional area. However, as illustrated in FIG. 8B, when the vehicle is driven at high speeds, the sound absorbing member 7 is repeatedly caused to warp toward the outside in the tire radial direction due to the centrifugal force generated as a result of the tire rolling, and the friction between the sound absorbing member 7 and the band member 8 is caused. As a result, the breakage of the sound absorbing member 7 occurs at edge portions (illustrated by dashed lines in FIG. 8B) of the band member 8.

As illustrated in FIG. 3, the chamfered portions C1 and C2 are each chamfered as a flat surface. Angles at which the chamfered portions C1 and C2 are inclined with respect to the width direction of the band member 8 are respectively referred to as angles θ1 and θ2. At this time, the angle θ of the chamfered portion C1 is in a range of $110° \leq \theta 1 \leq 160°$, and the angle θ2 of the chamfered portion C2 is in a range of $110° \leq \theta 2 \leq 160°$. Both the angles θ1 and θ2 of the chamfered portions C1 and C2 are more preferably set to be in a range from 135° to 160°. Further, in an aspect illustrated in FIG. 3, the angle θ1 of the chamfered portion C1 and the angle θ2 of the chamfered portion C2 are identical. Specifically, the band member 8 has an axial-symmetrical shape, with a center line that is parallel with the width direction of the band member 8 being an axis of symmetry. By forming the chamfered portions C1 and C2 in this way, the breakage of the sound absorbing member 7 and the damage to the tire inner surface 5 that are caused by the friction between the band member 8 and the sound absorbing member 7 and between the band member 8 and the tire inner surface 5 can be more effectively inhibited. Here, when the angles θ1 and θ2 of the chamfered portions C1 and C2 are smaller than 110°, the edge portions of the band member 8 become closer to right angles, and a level of the damage caused by the friction between the band member 8 and the sound absorbing member 7 and between the band member 8 and the tire inner surface 5 worsens. On the other hand, when the angles θ1 and θ2 of the chamfered portions C1 and C2 exceed 160°, an effect on inhibiting the breakage of the sound absorbing member 7 and the damage to the tire inner surface 5 deteriorates.

Figure 4:
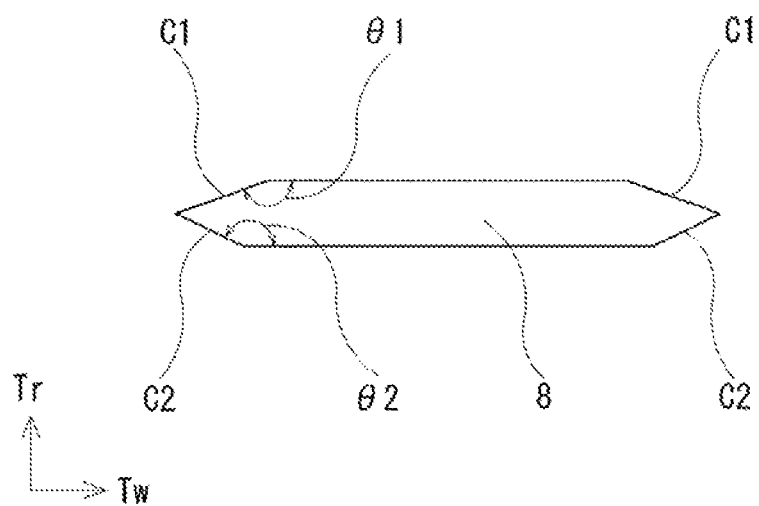
FIG. 4 is a cross-sectional view schematically illustrating a modified example of a band member in a tire noise reduction device according to an embodiment of the present technology.

In an example illustrated in FIG. 4, the angle θ1 of the chamfered portion C1 is set to be larger than the angle θ2 of the chamfered portion C2. Both the angles θ1 and θ2 of the chamfered portions C1 and C2 are preferably set to be in a range from 135° to 160°. Since durability of the sound absorbing member 7 is lower than that of the tire inner surface 5 with respect to the friction with the band member 8, by making the angle θ1 of the chamfered portion C1 on the sound absorbing member 7 side relatively larger, the durability of the sound absorbing member 7 with respect to the friction with the band member 8 is improved. On the other hand, by making the angle θ2 of the chamfered portion C2 on the tire inner surface 5 side relatively smaller, the cross-sectional area of the band member 8 is made as large as possible, and thus, weakening of the strength of the band member 8 can be minimized.

Figure 5:
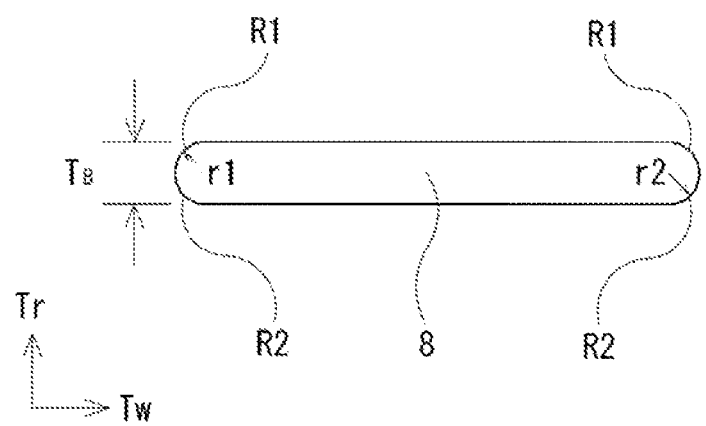
FIG. 5 is a cross-sectional view schematically illustrating another modified example of a band member in a tire noise reduction device according to an embodiment of the present technology.

In an example illustrated in FIG. 5, chamfered portions R1 and R2, on which chamfering is performed, are formed on both surface sides at both ends in the width direction of the band member 8. Of the chamfered portions R1 and R2, the portions disposed on the inner circumferential surface side (on the inside in the tire radial direction) of the band member 8 and adjacent to the sound absorbing member 7 are the chamfered portions R1, and the portions disposed on the outer circumferential surface side (on the outside in the tire radial direction) of the band member 8 and adjacent to the tire inner surface 5 are the chamfered portions R2.

The chamfered portions R1 and R2 are each chamfered as a curved surface. Radii of curvature of the chamfered portions R1 and R2 are respectively referred to as radii of curvature r1 and r2. At this time, with respect to a thickness $T_B$ of the band member 8, a radius of curvature r1 of the chamfered portion R1 and a radius of curvature r2 of the chamfered portion R2 respectively have relationships of $0.1 T_B \leq r1 \leq 0.5 T_B$ and $0.1 T_B \leq r2 \leq 0.5 T_B$. The radii of curvature r1 and r2 are more preferably set to be in a range of $0.3 T_B \leq r1 \leq 0.5 T_B$ and $0.3 T_B \leq r2 \leq 0.5 T_B$, respectively. Further, in an aspect illustrated in FIG. 5, the radius of curvature r1 of the chamfered portion R1 and the radius of curvature r2 of the chamfered portion R2 are identical. Specifically, the band member 8 has the axial-symmetrical shape with the center line that is parallel with the width direction of the band member 8 being the axis of symmetry. By forming the chamfered portions R1 and R2 in this way, the breakage of the sound absorbing member 7 and the damage to the tire inner surface 5 that are caused by the friction between the band member 8 and the sound absorbing member 7 and between the band member 8 and the tire inner surface 5 can be more effectively inhibited. Here, when the radii of curvature r1 and r2 of the chamfered portions R1 and R2 are smaller than $0.1 T_B$, the effect on inhibiting the breakage of the sound absorbing member 7 and the damage to the tire inner surface 5 cannot be obtained sufficiently. On the other hand, when the radii of curvature r1 and r2 of the chamfered portions R1 and R2 exceed $0.5 T_B$, the effect on inhibiting the breakage of the sound absorbing member 7 and the damage to the tire inner surface 5 deteriorates.

Figure 6:
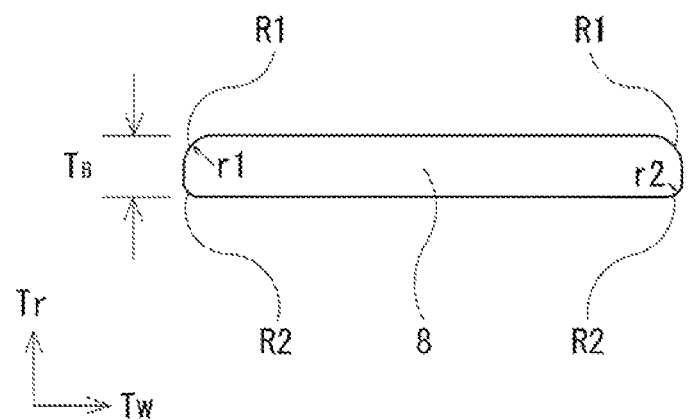
FIG. 6 is a cross-sectional view schematically illustrating another modified example of a band member in a tire noise reduction device according to an embodiment of the present technology.

In an example illustrated in FIG. 6, the radius of curvature r1 of the chamfered portion R1 is set to be larger than the radius of curvature r2 of the chamfered portion R2. Since durability of the sound absorbing member 7 is lower than that of the tire inner surface 5 with respect to the friction with the band member 8, by making the radius of curvature r1 of the chamfered portion R1 on the sound absorbing member 7 side relatively larger, the durability of the sound absorbing member 7 with respect to the friction with the band member 8 is improved. On the other hand, by making the radius of curvature r2 of the chamfered portion R2 on the tire inner surface 5 side relatively smaller, a cross-sectional area of the band member 8 is made as large as possible, and thus, the weakening of the strength of the band member 8 can be minimized.

Figure 7A:
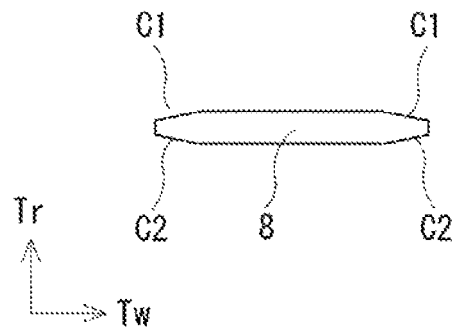
FIGS. 7A to 7C are each a cross-sectional view schematically illustrating another modified example of a band member in a tire noise reduction device according to an embodiment of the present technology.
Figure 7B:
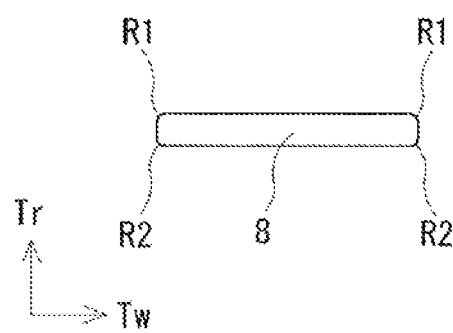
Figure 7C:
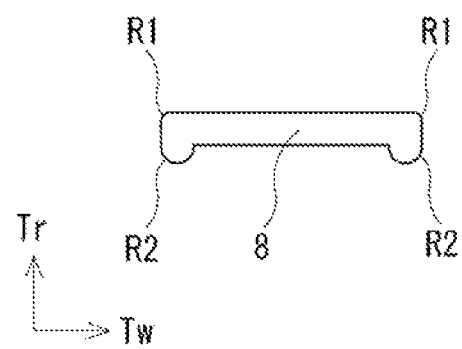

A cross-sectional shape of the chamfered portions of the band member 8 is not particularly limited. Examples can include a case in which the chamfered portions C1 and C2 formed as flat surfaces are formed so as to have large and identical angles with respect to the width direction of the band member 8, as illustrated in FIG. 7A, a case in which the chamfered portions R1 and R2 formed as curved surfaces are formed so as to have small and identical radii of curvature, as illustrated in FIG. 7B, and a case in which both ends of the band member 8 in the width direction are bent toward the outside in the tire radial direction, and the chamfered portions R1 and R2 formed as curved surfaces are formed at all the edge portions of the band member 8, as illustrated in FIG. 7C.

EXAMPLES

In a tire noise reduction device provided with a sound absorbing member made of a porous material and a band member provided for attaching the sound absorbing member to a tire inner surface and disposed between the sound absorbing member and the tire inner surface, Comparative Examples 1 to 4 and Examples 1 to 5 of noise reduction devices, in which chamfered portions formed as flat surfaces were formed in the band member, were manufactured, the chamfered portions of the band member having various different configurations. Further, Conventional Example 1 was prepared as a known noise reduction device in which the chamfered portions were not provided in the band member. These noise reduction devices are suitable for a pneumatic tire of a tire size of 245/50R18.

In Comparative Examples 1 to 4 and Examples 1 to 5, the presence of the chamfered portions, positions of the chamfered portions (in the width direction of the band member), positions of the chamfered portions (in the thickness direction of the band member), the angle θ1 of the chamfered portion C1, and the angle θ2 of the chamfered portion C2 were set as shown in Table 1.

In Table 1, with respect to the positions of the chamfered portions (in the thickness direction of the band member), a case in which the chamfered portions are provided only on the inner circumferential surface side of the band member is referred to as a "sound absorbing member side," a case in which the chamfered portions are provided only on the outer circumferential surface side of the band member is referred to as a "tire inner surface side," and a case in which the chamfered portions are provided both on the inner circumferential surface side and the outer circumferential surface of the band member is referred to as "both surface sides."

Each of the noise reduction devices of the Conventional Example 1, Comparative Examples 1 to 4, and Examples 1 to 5 described above was tested according to the following test method and evaluated for a breakage occurrence speed of the sound absorbing member and a degree of damage to the tire inner surface, and the results are shown in Table 1.

Breakage Occurrence Speed of Sound Absorbing Member

Each of the noise reduction devices was mounted in a cavity portion of a pneumatic tire with a tire size of 245/50R18, that was subjected to dry heat treatment at 80° C. for 120 hours with oxygen filled inside. The pneumatic tires were then assembled on wheels having a rim size of 18×8J, and a traveling test was conducted under the conditions of an air pressure of 200 kPa and a load of 7.8 kN using a drum testing machine. More specifically, an initial speed was set at 120 km/h, and the speed was increased by 10 km/h every 24 hours. Each of the pneumatic tires traveled until the breakage occurred in the sound absorbing member, and the speed reached at that point was measured.

Degree of Damage to Tire Inner Surface

After the breakage occurrence speed test of the sound absorbing member described above was carried out, conditions of the tire inner surface were examined. The degree of damage to the tire inner surface was indicated as "A" when there were no scratches on an inner liner, "B" when there were scratches on the inner liner, and "C" when there was peeling of the inner liner.

TABLE 1

|  | Conventional Example 1 | Comparative Example 1 | Comparative Example 2 | Comparative Example 3 | Comparative Example 4 |
|---|---|---|---|---|---|
| Presence of chamfered portions | No | Yes | Yes | Yes | Yes |
| Positions of chamfered portions (in width direction of band member) | — | Both ends | Both ends | Both ends | Both ends |
| Positions of chamfered portions (in thickness direction of band member) | — | Tire inner surface side | Sound absorbing member side | Sound absorbing member side | Sound absorbing member side |
| Angle θ1 of chamfered portions C1 | — | — | 110° | 135° | 160° |
| Angle θ2 of chamfered portions C2 | — | 135° | — | — | — |
| Breakage occurrence speed of sound absorbing member (km/h) | 150 | 150 | 170 | 180 | 190 |
| Degree of damage to tire inner surface | C | A | C | C | C |

|  | Example 1 | Example 2 | Example 3 | Example 4 | Example 5 |
|---|---|---|---|---|---|
| Presence of chamfered portions | Yes | Yes | Yes | Yes | Yes |
| Positions of chamfered portions (in width direction of band member) | Both ends | Both ends | Both ends | Both ends | Both ends |

TABLE 1-continued

| Positions of chamfered portions (in thickness direction of band member) | Both surface sides | Both surface sides | Both surface sides | Both surface sides | Both surface sides |
|---|---|---|---|---|---|
| Angle θ1 of chamfered portions C1 | 110° | 135° | 160° | 135° | 160° |
| Angle θ2 of chamfered portions C2 | 110° | 135° | 160° | 110° | 135° |
| Breakage occurrence speed of sound absorbing member (km/h) | 170 | 180 | 190 | 180 | 190 |
| Degree of damage to tire inner surface | B | A | A | B | A |

As illustrated in Table 1, compared with Conventional Example 1, both the breakage occurrence speed of the sound absorbing member and the degree of damage to the tire inner surface were improved in the noise reduction devices of Examples 1 to 5. In contrast, in Comparative Example 1, since the chamfered portions were provided only on the tire inner surface side, an improvement effect on the breakage occurrence speed of the sound absorbing member was insufficient. In Comparative Examples 2 to 4, since the chamfered portions were provided only on the sound absorbing member side, the damage to the tire inner surface was observed.

Next, similarly to Comparative Examples 1 to 4 and Examples 1 to 5, noise reduction devices of Comparative Examples 5 to 8 and Examples 6 to 10, in which chamfered portions formed as curved surfaces were formed in the band member, were manufactured, the chamfered portions of the band member having various different configurations. In Comparative Examples 5 to 8 and Examples 6 to 10, the presence of the chamfered portions, the positions of the chamfered portions (in the width direction of the band member), the positions of the chamfered portions (in the thickness direction of the band member), the radius of curvature r1 of the chamfered portion R1, and the radius of curvature r2 of the chamfered portion R2 were set as shown in Table 2. Further, Conventional Example 2 was prepared as the known noise reduction device in which the chamfered portions were not provided in the band member.

Each of the noise reduction devices of the Conventional Example 2, Comparative Examples 5 to 8, and Examples 6 to 10 was tested according to the test method described above and evaluated for the breakage occurrence speed of the sound absorbing member and the degree of damage to the tire inner surface, and the results are shown in Table 2.

TABLE 2

| | Conventional Example 2 | Comparative Example 5 | Comparative Example 6 | Comparative Example 7 | Comparative Example 8 |
|---|---|---|---|---|---|
| Presence of chamfered portions | No | Yes | Yes | Yes | Yes |
| Positions of chamfered portions (in width direction of band member) | — | Both ends | Both ends | Both ends | Both ends |
| Positions of chamfered portions (in thickness direction of band member) | — | Tire inner surface | Sound absorbing member side | Sound absorbing member side | Sound absorbing member side |
| Radius of curvature r1 of chamfered portion R1 | — | — | $0.1T_B$ | $0.3T_B$ | $0.5T_B$ |
| Radius of curvature r2 of chamfered portion R2 | — | $0.3T_B$ | — | — | — |
| Breakage occurrence speed of sound absorbing member (km/h) | 150 | 150 | 170 | 180 | 190 |
| Degree of damage to tire inner surface | C | A | C | C | C |

| | Example 6 | Example 7 | Example 8 | Example 9 | Example 10 |
|---|---|---|---|---|---|
| Presence of chamfered portions | Yes | Yes | Yes | Yes | Yes |
| Positions of chamfered portions (in width direction of band member) | Both ends | Both ends | Both ends | Both ends | Both ends |
| Positions of chamfered portions (in thickness direction of band member) | Both surface sides | Both surface sides | Both surface sides | Both surface sides | Both surface sides |
| Radius of curvature r1 of chamfered portion R1 | $0.1T_B$ | $0.3T_B$ | $0.5T_B$ | $0.3T_B$ | $0.5T_B$ |
| Radius of curvature r2 of chamfered portion R2 | $0.1T_B$ | $0.3T_B$ | $0.5T_B$ | $0.1T_B$ | $0.3T_B$ |

TABLE 2-continued

| | | | | | |
|---|---|---|---|---|---|
| Breakage occurrence speed of sound absorbing member (km/h) | 170 | 180 | 190 | 180 | 190 |
| Degree of damage to tire inner surface | B | A | A | B | A |

As illustrated in Table 2, compared with Conventional Example 2, both the breakage occurrence speed of the sound absorbing member and the degree of damage to the tire inner surface were improved in the noise reduction devices of Examples 6 to 10. In contrast, in Comparative Example 5, since the chamfered portions were provided only on the tire inner surface side, the improvement effect on the breakage occurrence speed of the sound absorbing member was insufficient. In Comparative Examples 6 to 8, since the chamfered portions were provided only on the sound absorbing member side, the damage to the tire inner surface was observed.

The invention claimed is:

1. A tire noise reduction device, comprising:
a sound absorbing member made of a porous material; and
a band member formed in an annular shape along a tire inner surface disposed on a radially outer side of the sound absorbing member and configured to attach the sound absorbing member to the tire inner surface,
the band member including chamfered portions on both surface sides at both ends in a width direction of the band member; wherein
the both surface sides include a first side of the band member extending along a length direction of the band member and facing the tire inner surface and a second side opposite the first side; and
the chamfered portions are intermittently disposed along a length of the band member.

2. The tire noise reduction device according to claim 1, wherein
each of the chamfered portions in the band member is formed as a flat surface, and
an angle $\theta 1$, with respect to the width direction of the band member, of a chamfered portion C1 positioned on an inner circumferential surface side of the band member, and an angle $\theta 2$, with respect to the width direction of the band member, of a chamfered portion C2 positioned on an outer circumferential surface side of the band member are respectively set to be in a range of $110° \leq \theta 1 \leq 160°$ and $110° \leq \theta 2 \leq 160°$.

3. The tire noise reduction device according to claim 2, wherein the angle $\theta 1$ is larger than the angle $\theta 2$.

4. The tire noise reduction device according to claim 1, wherein
each of the chamfered portions in the band member is formed as a curved surface, and
a radius of curvature r1 of a chamfered portion R1 positioned on an inner circumferential surface side of the band member, and a radius of curvature r2 of a chamfered portion R2 positioned on an outer circumferential surface side of the band member are respectively set to be in a range of $0.1\ T_B \leq r1 \leq 0.5\ T_B$ and $0.1\ T_B \leq r2 \leq 0.5\ T_B$ with respect to a thickness $T_B$ of the band member.

5. The tire noise reduction device according to claim 4, wherein the radius of curvature r1 is larger than the radius of curvature r2.

6. A pneumatic tire comprising the tire noise reduction device according to claim 5.

7. A pneumatic tire comprising the tire noise reduction device according to claim 1.

8. The tire noise reduction device according to claim 1, further comprising locking members coupled to the band member, wherein the sound absorbing member is sandwiched between the band member and the locking members.

* * * * *